Patented May 24, 1949

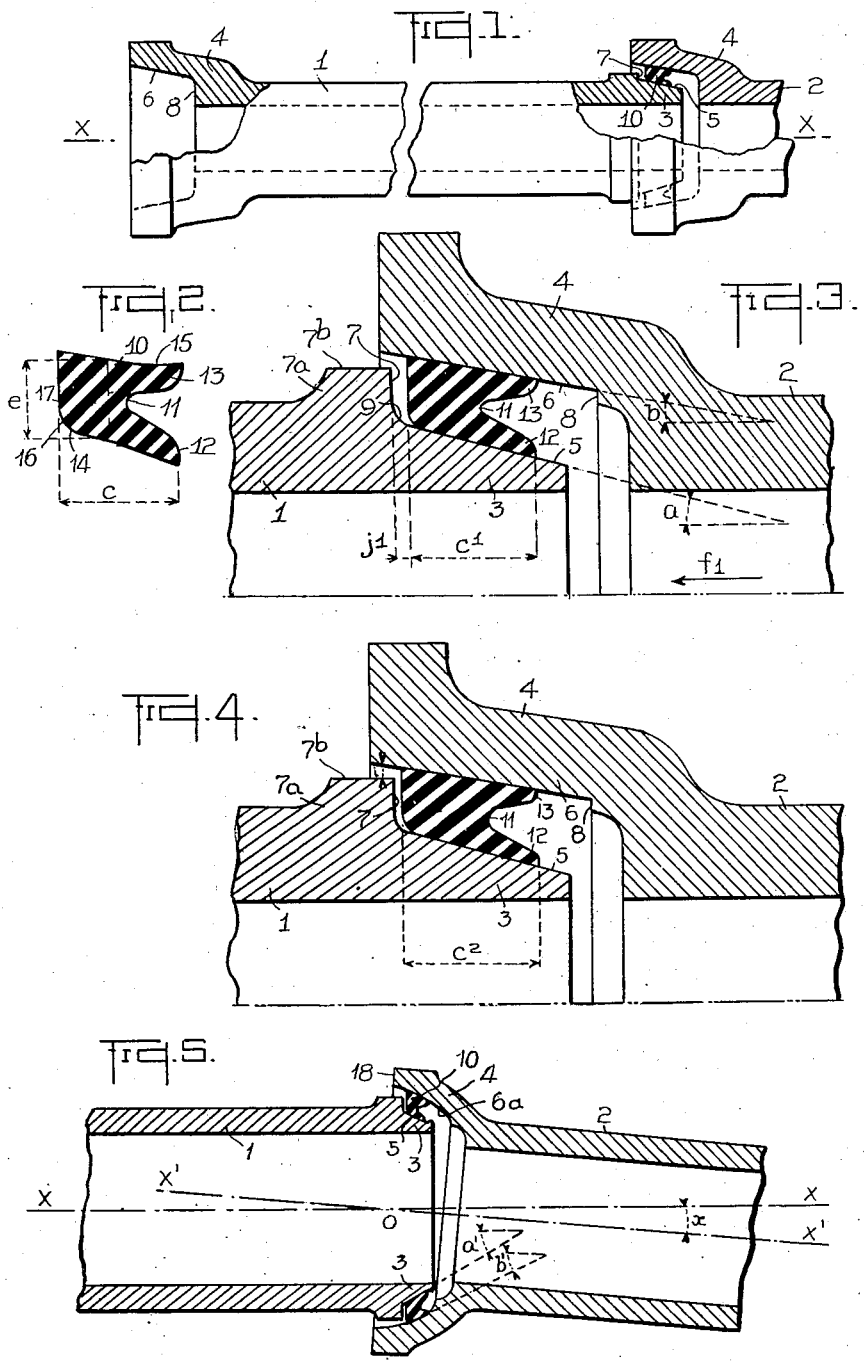

2,470,883

UNITED STATES PATENT OFFICE 2,470,883

PIPE CONNECTION AND PACKING RING THEREFOR

Pierre Boissou, Pont-a-Mousson, France, assignor to Compagnie De Pont-a-Mousson, Nancy, France, a French company Application August 7, 1947, Serial No. 767,025
In France January 27, 1939

Section 1, Public Law 690, August 8, 1946
Patent expires January 27, 1959

2 Claims. (Cl. 285—163)

The invention relates to the fluidtight connection of pipes and other elements of pipe lines (elbows, connectors, etc.) subjected to internal fluid pressure, and it has for its object to provide a connection having an efficient fluidtightness, which can be adjusted according to the internal pressure.

More specifically the invention has for its object to devise a bell and spigot and a packing ring adapted to fit between the bell and spigot, all of which are of such shape that fluidtightness is ensured independently of the internal fluid pressure by deformation of the ring, while additional fluidtightness is obtained, in response to the internal fluid pressure, under the action of said fluid pressure on said packing ring.

Further features of the invention will be apparent from the following description, with reference to the appended drawing, in which:

Fig. 1 is an elevational view with parts, broken away, of a pipe and pipe connection.

Fig. 2 is an enlarged cross-section of the packing ring in the free state.

Fig. 3 is an enlarged cross-section of the connection shown in Fig. 1.

Fig. 4 is a view similar to Fig. 3 showing another relative axial position of the pipes to be assembled, and Fig. 5 is a cross section through a modification of the pipe connection.

Referring to Figs. 1 to 4, 1 and 2 denote identical pipes of any suitable material, each provided at one end with a spigot 3 and a bell 4. The internal surface 6 of bell 4 and the external surface 5 of spigot 3 are of frusto-conical shape and coaxial with the axis X—X of the pipes, and the inclination $a$ of the spigot surface 5 (Fig. 3) is greater than the inclination $b$ of the bell surface 6, relatively to axis X—X. The spigot surface 5 is connected with a radial shoulder 7 by a rounded portion 9 and the spigot surface 6 extends inwardly to a radial shoulder 8.

Shoulder 7 is preferably formed by one lateral face of a collar 7$^a$ of the pipe, the periphery 7$^b$ whereof has such an outer diameter as to engage the bell with a suitable clearance.

Between the surfaces 5 and 6 of adjacent pipes is arranged a packing ring of elastic or resilient material 10 adapted to secure fluidtightness of the connection, the ring being stretched when applied over the surface 5. Said ring possesses a circular groove 11 leaving a pair of flaps 12 and 13, which, when the ring is mounted in place, are adapted to be applied in a fluidtight manner upon surfaces 5 and 6, the groove facing the interior of the piping.

According to the nature of the fluid and the pressure thereof in service, ring 10 may be made of plain rubber or rubber reinforced with canvas. The outer surface may be protected from the action of the fluid by a protecting layer of rubber, synthetic resin or any other plastic material.

The ring is deformed when mounted in place and, in the free state (Fig. 2), the axial length $c$ of the ring is smaller than the axial length thereof when pressed between the spigot and the bell. The length of the ring in the deformed state depends on the relative axial position of the pipes to be connected, it being $c_1$ in Fig. 3 and $c_2$ in Fig. 4, but it should always be less than the axial length of the surface 5 of the spigot 3.

The average radial thickness $e$ of the ring in the free state is larger than its thickness when mounted in place. In other words, the ring, when mounted in place, undergoes an axial elongation and a radial contraction.

The inner surface 14 and the outer surface 15 of the solid portion of the ring have a frusto-conical shape, the inclinations being preferably equal to the inclinations $a$ and $b$ of the surfaces 5 and 6 of the spigot and bell, respectively. However, the shape of the flaps 12, 13, in the free state, is such that they diverge from each other to a greater extent than surfaces 5 and 6, as shown in Fig. 2, so that said flaps resiliently engage said surfaces as soon as the ring is placed in position between the spigot and the bell and are ready to secure additional fluidtightness under the effect of the internal pressure which prevails in the piping and which applies the flaps against the adjacent surfaces with a certain pressure, adding to the pressure resulting from the elastic deformation of the flaps against said surfaces.

The average diameter of the inner surface 14 of the ring is smaller than the average diameter of the surface 5 of the spigot, whereby the ring, stretched over the spigot, will be resiliently held thereon.

The inner surface 14 of the ring is preferably connected with the radial face 17 thereof, at the side opposite the groove, through a rounded surface 16 (Fig. 2).

Due to the shape and dimensions of ring 10 in the free state, the latter, when threaded over the spigot, will undergo the following deformations:

(a) peripheral elongation, which, as above stated, causes the ring to adhere to the spigot with a certain elastic pressure.

(b) axial elongation from $c$ to $c_1$ (or $c_2$).

(c) radial contraction to a thickness less than $e$ but still large enough in order that the surface 6 of the bell engages said ring as pipe 2 is moved toward pipe 1 in the direction of arrow $f_1$ (Fig. 3), to a position such as to leave a suitable radial clearance $i$ (Fig. 4) between the bell and the collar of the spigot.

When threading ring 10 over the spigot, a rather large clearance $j_1$ (Fig. 3) should be left between its radial face 17 and shoulder 7.

The pipes being assembled in the manner shown in the drawing, the fluidtightness is ensured by both the following effects.

On the one hand, the solid portion of the ring is resiliently pressed against surfaces 5 and 6; this is due, for surface 6, to the radial compression of the ring between surfaces 5 and 6 and, for surface 5, to said radial compression and also to the peripheral elongation of the ring when threaded over the spigot.

On the other hand, flaps 12 and 13 are pressed, as aforesaid, against surfaces 5 and 6, respectively, under the fluid pressure prevailing in the piping transmitted to groove 11.

If the fluid pressure is such as to force the ring outwardly, the radial compression of the solid portion is increased, due to the progressively outwardly decreasing distance between the inequally tapering surfaces 5 and 6. This increased compression and correlative pressure stops the ring in a new position of equilibrium and increases the efficiency of the packing ring.

It will be noted that if the fluid pressure in the piping falls to or below the atmospheric pressure, the solid portion of the ring, pressed between conical surfaces 5 and 6, still ensures the desired fluidtightness.

The connection above described allows for axial and angular relative displacements of the pipes without impairing the fluidtightness.

Due to the tapering shape of surfaces 5 and 6, axial displacements cause variations in the radial compression of ring 10. Thus a displacement of the pipes toward each other increases the radial compression and axial elongation of the ring (compare Figs. 3 and 4) and hence the fluidtightness. Such an axial displacement may be willingly produced so as to increase the fluidtightness to meet particularly severe internal pressure conditions of the fluid. An incidental displacement of the pipes away from each other will decompress the solid portion of the ring to a certain extent. However, the internal pressure of the fluid will then become operative to force the ring farther away toward the outer end of the bell, and, due to the tapering formation of the gap between surfaces 5 and 6, this movement of the ring tends to automatically compensate for the decompression of the solid portion thereof, thus restoring the proper fluidtightness.

Fig. 5 shows a modification adapted for large relative angular displacements of pipes 1 and 2, wherein the internal surface $6^a$ of the bell is of spherical shape, the center O of the sphere being adapted to coincide substantially with the crossing point of the axis X—X and X'—X' of the pipes to be assembled (assuming they are slightly out of alignment), i. e. at a suitable distance outwardly from the plane of the mouth of the bell. The arrangement is such that the cone which is tangent to the spherical zone toward the middle of the length thereof, has an angle $b'$ which is less than the angle $a'$ of the conical surface 5 of the spigot.

When one of the pipes rotates about center O, surface $6^a$ slides over the outer surface 10 of the ring, without changing the degree of compression of the solid portion thereof; the angular displacement $x$ may be relatively large.

Such connections are particularly useful for devising pipings which are dug in the ground and are thus subjected to movements of the soil, in conditions which are practically uncontrollable.

Obviously, the invention is not limited to the details of construction above described in detail. Thus the collar $7^a$ of Figs. 1 to 4 may be dispensed with, shoulder 7 being formed in that case by a reduced thickness of the spigot relatively to the pipe body. Moreover, the inner and outer surfaces of the ring, instead of tapering to the same extent as the coacting surfaces of the spigot and bell, may be made parallel, the ring assuming its proper shape once mounted in place.

Having now described my invention what I claim as new and desire to secure by Letters Patent is:

1. A fluid seal for a bell and spigot pipe joint comprising a bell member having an internally tapered bell surface and a cooperating spigot member having an externally tapered spigot surface, said spigot member having a shoulder at the junction of the tapered portion with the rest of the pipe body, said tapered surfaces lying opposite one another when the respective pipes are joined, the degree of taper of the spigot surface being greater than that of the bell surface with respect to the longitudinal axis of the pipe, and a packing ring positioned between said members and engaging said surfaces, and limited in movement in one direction by said shoulder, said ring comprising a body having a solid portion adjacent the bell mouth and two annular flaps extending toward the spigot end, said ring being of a diameter less than that of the spigot member and stretched over said spigot member, the solid portion of said ring being compressed between the said surfaces to form a seal when the pipes are joined, while the flaps are adapted to be compressed against the bell and spigot tapered surfaces by the prevailing internal pressure.

2. A pipe connection, as set forth in claim 1, wherein the spigot surface is frusto-conical and the bell surface has the shape of a spherical zone, the center of which is situated on the pipe axis at a point outside of a line drawn across the transverse plane of the bell mouth, whereby the taper of the cone tangent to said spherical zone in the middle thereof is less than the taper of said spigot surface.

PIERRE BOISSOU.

REFERENCES CITED

The following references are of record in the file of this patent:

UNITED STATES PATENTS

| Number | Name | Date |
|---|---|---|
| 2,032,576 | Hering | Mar. 3, 1936 |
| 2,230,725 | Nathan | Feb. 4, 1941 |
| 2,272,812 | Neal | Feb. 10, 1942 |
| 2,398,399 | Alexandria | Apr. 16, 1946 |